US009784983B1

United States Patent
Zha (10) Patent No.: US 9,784,983 B1
(45) Date of Patent: Oct. 10, 2017

(54) THREE-DIMENSIONAL DISPLAY MODULE AND DISPLAY DEVICE COMPRISING FIRST AND SECOND CYLINDER LENS ASSEMBLIES EACH HAVING A REFRACTIVE INDEX DIFFERENT FROM EACH OTHER

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Techno0logy Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/204,859

(22) Filed: Jul. 7, 2016

(30) Foreign Application Priority Data

Apr. 12, 2016 (CN) .................. 2016 1 02258708

(51) Int. Cl.
*G02B 27/22* (2006.01)
*G02F 1/139* (2006.01)
*G02F 1/1335* (2006.01)

(52) U.S. Cl.
CPC ....... *G02B 27/2214* (2013.01); *G02F 1/1393* (2013.01); *G02F 1/133528* (2013.01)

(58) Field of Classification Search
CPC . G02B 27/2228; G02B 27/22; G02B 27/2278
See application file for complete search history.

(56) References Cited

U.S. PATENT DOCUMENTS

| 6,246,451 B1* | 6/2001 | Matsumura | ........ G02B 27/2214 348/59 |
| 2010/0259697 A1* | 10/2010 | Sakamoto | .......... G02B 27/2214 349/15 |
| 2013/0217161 A1* | 8/2013 | Hsu | ..................... H01L 25/0753 438/29 |
| 2014/0133020 A1* | 5/2014 | Woodgate | .......... H04N 13/0402 359/462 |
| 2015/0260999 A1* | 9/2015 | Wang | ................. G02B 27/2214 349/15 |

* cited by examiner

*Primary Examiner* — Paul Lee
(74) *Attorney, Agent, or Firm* — Andrew C. Cheng (57) ABSTRACT

A three-dimensional (3D) display module and a 3D display device are disclosed. The 3D display module has a first assembly and second lens assemblies respectively having multiple first and second lenses arranged in parallel. The extending directions of the first and second lens assemblies intersect to form a specific angle and the refractive indexes of the first and second cylinder lenses are different. A liquid crystal layer is formed between the first and second cylinder lens assemblies. A first and second electrode layer are respectively formed on two sides of the liquid crystal layer. By a control technique of arranging the cylinder lens and the liquid crystals in a specific angle, a lateral and perpendicular autostereoscopic 3D display effect is accomplished. The 3D display module has advantages of a simple manufacturing and an advantage of thinning since a period and a focal length of the cylinder lens are smaller.

10 Claims, 5 Drawing Sheets

THREE-DIMENSIONAL DISPLAY MODULE AND DISPLAY DEVICE COMPRISING FIRST AND SECOND CYLINDER LENS ASSEMBLIES EACH HAVING A REFRACTIVE INDEX DIFFERENT FROM EACH OTHER

FIELD OF THE INVENTION

The present invention relates to a 3D display technology field, especially to a 3D display module and 3D display device.

BACKGROUND OF THE INVENTION

The three-dimensional (3D) display technology induces a new dimension based on a plan display technology to form the 3D display close to the real word sense and becomes a popular electric display technology. The present mainstream autostereoscopic 3D display technology includes directional backlit, parallax barriers, lenticular lenses or liquid crystal lens etc. technology. The presentation of the 3D image is relied on an arrangement direction of the above-mentioned structure. The known autostereoscopic 3D display technology does not suit for a portable electronic device with variable display angles. The display provider aggressively develops how to change the display angle of the 3D display.

The present known rotatable autostereoscopic 3D display device substantially utilizes the liquid crystal lens technology, multiple electrodes arranged in perpendicular control the arrangement directions of the liquid crystal lenses to accomplish a lateral and perpendicular autostereoscopic 3D display. The advantage of the liquid crystal lens is quick-switching. However, a focus effect is achieved by a complex arrangement of the liquid crystals and more electrodes are required. Since a single liquid crystal in 3D display technology according to the present liquid crystal lens has a greater period, the single liquid crystal in 3D display technology is widely limited in comparison with the lenticular lens having a fine film face structure and a smaller lens period.

SUMMARY OF THE INVENTION

The present invention substantially solves the technology problem is to provide a 3D display module and 3D display device to achieve a lateral and perpendicular autostereoscopic 3D display effect, has a simple manufacturing and is thinned easily.

To solve the above-mentioned technology problem, the present invention provides a 3D display module, having:

a first cylinder lens assembly having multiple first cylinder lenses arranged in parallel;

a second cylinder lens assembly having multiple second cylinder lenses arranged in parallel, wherein an extending direction of the first cylinder lens and an extending direction of the second cylinder lens intersect to form a specific angle, and a refractive index of the first cylinder lens is different from a refractive index of the second cylinder lens;

a liquid crystal layer formed between the first and second cylinder lens assemblies or respectively formed on two sides of the first and second cylinder lens assemblies;

a first electrode layer formed on a side of the liquid crystal layer; and a second electrode layer formed on another side of the liquid crystal layer;

wherein, multiple liquid crystal molecules of the liquid crystal layer are controlled to deflect by an electric field between the first and second electrode layers, wherein under a first deflection status, an equivalent refractive index of the liquid crystal layer matches a refractive index of the first cylinder lens, but does not match a refractive index of the second cylinder lens; and under a second deflection status, the equivalent refractive index of the liquid crystal layer does not match the refractive index of the first cylinder lens but matches a refractive index of the second cylinder lens.

Further, the liquid crystal molecule of the liquid crystal layer comprises an ordinary refractive index and an extraordinary refractive index, wherein the refractive indexes of the first and second cylinder lenses are between the ordinary and extraordinary refractive indexes.

Under the first deflection status, a refractive index difference between the equivalent refractive index of the liquid crystal layer and the refractive index of the first cylinder lens is less than a threshold, a refractive index difference between the equivalent refractive index of the liquid crystal layer and the refractive index of the second cylinder lens is greater than the threshold; and under the second deflection status, the refractive index difference between the equivalent refractive index of the liquid crystal layer and the refractive index of the first cylinder lens is greater than the threshold and the refractive index difference between the equivalent refractive index of the liquid crystal layer and the refractive index of the second cylinder lens is less than the threshold.

Further, the liquid crystal layer is formed between the first and second lens assemblies, wherein the first electrode layer is formed on a side of the first cylinder lens assembly departing from the liquid crystal layer and the second electrode layer is formed on a side of the second cylinder lens assembly departing from the liquid crystal layer.

Further, an extending direction of the first cylinder lens and an extending direction of the second cylinder lens are perpendicular to each other.

Further, the first and second cylinder lenses are respectively convex lens structures or concave lens structures.

To solve the above-mentioned technology problem, the present invention further provides a 3D display device, having:

a display panel and anyone of the above-mentioned 3D display module mounted on the display panel.

Further, the display panel comprises a polarizer formed next to the 3D display module and having previous to light axis, wherein an alignment direction of the liquid crystal layer is parallel to the pervious to light axis of the polarizer.

Further, an extending direction of the first cylinder lens is parallel to one of the long or short sides of the display panel 31; and an extending direction of the second cylinder lens is parallel to the other one of the long or short sides of the display panel, or the extending directions of the first and second cylinder lenses are mounted and inclined to the long and short sides of the 3D display device.

Further, the first cylinder lens is mounted adjacent to the display panel, wherein a focal length of the first cylinder lens under a first deflection status is greater than a focal length of the second cylinder lens under a second deflection status.

The advantages of the present invention are: to distinguish the prior art the 3D display module and 3D display device of the present invention accomplishes a lateral and perpendicular autostereoscopic 3D display effect by a control technique of combining the cylinder lens arranged in a specific angle and an arrangement of the liquid crystals. With comparison to a complex arrangement of the electrodes of liquid crystals, the present invention has advantages of a simple manufacturing and thinning since a period and a focal length of the cylinder lens are smaller.

DETAILED DESCRIPTION OF THE PREFERRED EMBODIMENTS

In conjunction with the accompanying drawings and the following embodiments of the present invention are described in detail.

Figure 1:
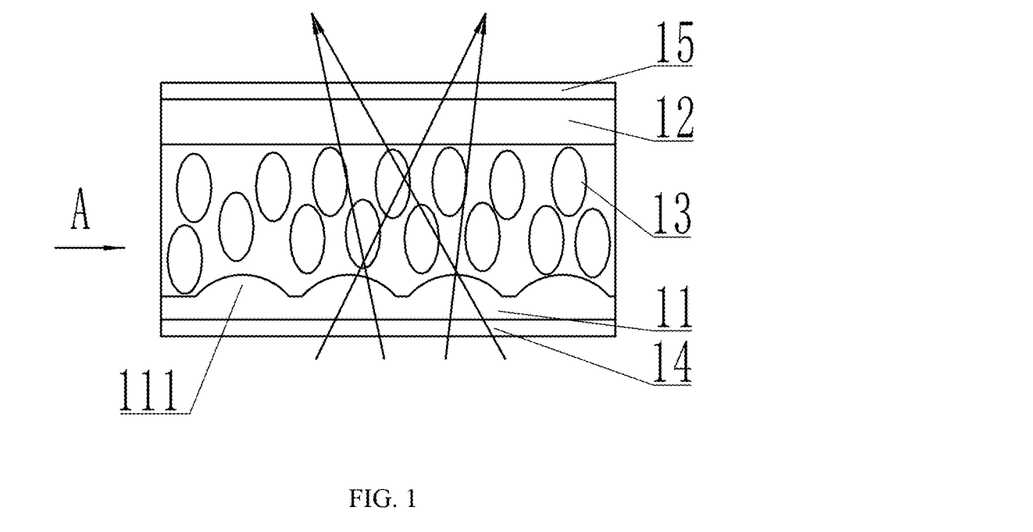
FIG. 1 is a structural schematic diagram of a first embodiment of a 3D display module of the present invention.
Figure 2:
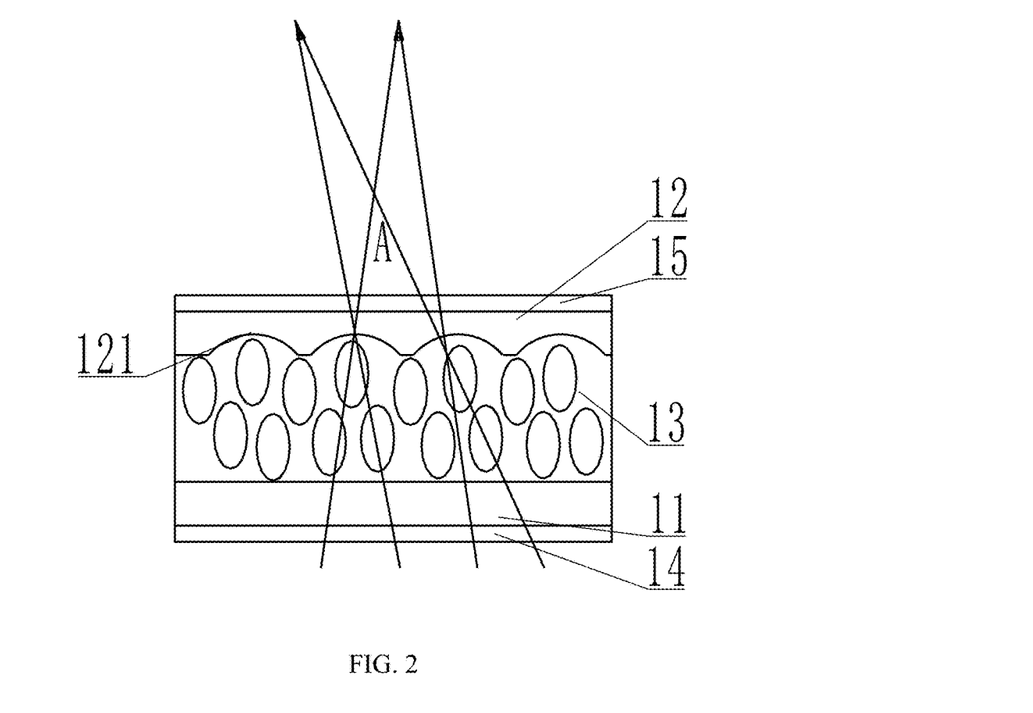
FIG. 2 is an A-direction view of the first embodiment of the 3D display module.
Figure 3:
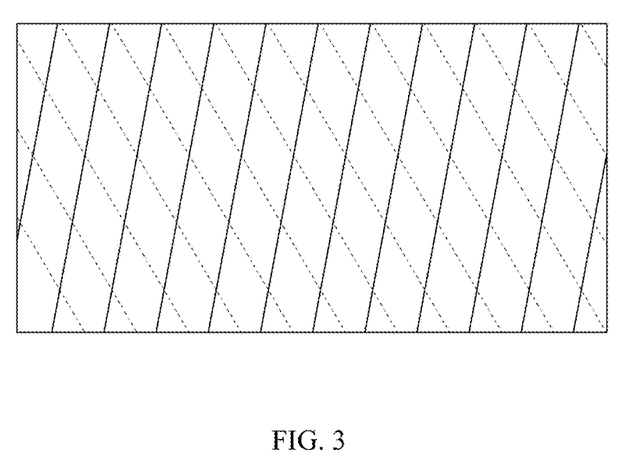
FIG. 3 is a schematic plan view of an arrangement of a cylinder lens in the first embodiment of the 3D display module.

With reference to FIG. 1, FIG. 2 and FIG. 3, FIG. 1 is a structural schematic diagram of a first embodiment of a 3D display module of the present invention, FIG. 2 is an A-direction view of the first embodiment of the 3D display module and FIG. 3 is a schematic plan view of an arrangement of a cylinder lens in the first embodiment of the 3D display module. The 3D display module of the present embodiment has following elements.

A first cylinder lens assembly 11 has multiple first cylinder lenses 11 arranged in parallel.

A second cylinder lens assembly 12 has multiple second cylinder lenses 121 arranged in parallel. With reference to FIG. 3, an extending direction of the first cylinder lens 111 (shown in an area marked by dotted lines in FIG. 3) and an extending direction of the second cylinder lens 112 (shown in an area marked by solid lines in FIG. 3) intersect to form a specific angle, and a refractive index of the first cylinder lens 111 is different from a refractive index of the second cylinder lens 112.

Further, the angle between the first and cylinder lenses 111, 112 is between 0 and 180 but is not equal to 0 and 180.

A liquid crystal layer 13 is formed between the first and second cylinder lens assemblies 11, 12, and liquid crystals may be positive or negative liquid crystals.

A first electrode layer 14 is formed to a side of the liquid crystal layer.

A second electrode layer 15 is formed to another side of the liquid crystal layer.

FIG. 1 shows a situation, wherein the first electrode layer 14 is formed on a side of the first cylinder lens assembly 11 departing from the liquid crystal layer 13, and the second electrode layer 15 is formed on a side of the second cylinder lens assembly 12 departing from the liquid crystal layer 13. Optionally, the first electrode layer 14 may be formed on another side of the first cylinder lens assembly 11 close to the liquid crystal layer 13, and the second electrode layer 15 may be formed on another side of the second cylinder lens assembly 12 close to the liquid crystal layer 13.

Further, liquid crystal molecules of the liquid crystal layer 13 are controlled to deflect by an electric field between the first and second electrode layers 14, 15. With reference to FIG. 2, FIG. 2 shows a propagation status of lights through the 3D display module (FIG. 2 does not show variations of the liquid crystals). Under a first deflection status, an equivalent refractive index of the liquid crystal layer 13 matches a refractive index of the first cylinder lens 111, but does not match a refractive index of the second cylinder lens 121. At the time, an interface between the first cylinder lens 111 and the liquid crystal molecules does not have a function of refracting lights. At the time, the second cylinder lens 121 provides a beam-splitting function so a direction perpendicular to the second cylinder lens provides an output of a 3D image. With reference to FIG. 1, FIG. 1 shows a propagation status of lights through the 3D display module (FIG. 1 does not show variations of the liquid crystals). Under a second deflection status, the equivalent refractive index of the liquid crystal layer 13 does not match the refractive index of the first cylinder lens 111 but matches a refractive index of the second cylinder lens 121. An interface between the second cylinder lens 121 and the liquid crystal molecules does not have a function of refracting lights. At the time, the first cylinder lens 111 provides a beam-splitting function so a direction perpendicular to the first cylinder lens provides the output of the 3D image.

In the first embodiment of the 3D display module of the present invention, by a control technique of combining the cylinder lens arranged in a specific angle and an arrangement of the liquid crystals, the liquid crystal molecules of the liquid crystal layer 13 are controlled to deflect by an electric field between the first and second electrode layers 14, 15 to accomplish a lateral and perpendicular autostereoscopic 3D display effect. With comparison to a complex arrangement of the electrodes of liquid crystals, the present invention has advantages of a simple manufacturing and thinning since a period and a focal length of the cylinder lens are smaller.

Further, the liquid crystal molecule of the liquid crystal layer 13 includes an ordinary refractive index and an extraordinary refractive index. The refractive indexes of the first and second cylinder lenses 111, 121 are between the ordinary and extraordinary refractive indexes. The first and second cylinder lenses 111, 121 are respectively convex lens structures or concave lens structures. The liquid crystal generally has a dual-reflection characteristic, a polarization direction of the ordinary refractive index is perpendicular to a long axis of molecule, and a polarization direction of the extraordinary refractive index is parallel to the long axis of molecule.

Further, optionally, under the first deflection status, a refractive index difference between the equivalent refractive index of the liquid crystal layer 13 and the refractive index of the first cylinder lens 111 is less than a threshold. A refractive index difference between the equivalent refractive index of the liquid crystal layer 13 and the refractive index of the second cylinder lens 121 is greater than the threshold.

Optionally, the equivalent refractive index of the liquid crystal layer 13 is equal to the refractive index of the first cylinder lens 111. Under the second deflection status, the refractive index difference between the equivalent refractive index of the liquid crystal layer 13 and the refractive index of the first cylinder lens 111 is greater than the threshold. The refractive index difference between the equivalent refractive index of the liquid crystal layer 13 and the refractive index of the second cylinder lens 121 is less than the threshold. Optionally, the equivalent refractive index of the liquid crystal layer 13 is equal to the refractive index of the second cylinder lens 121.

Figure 4:
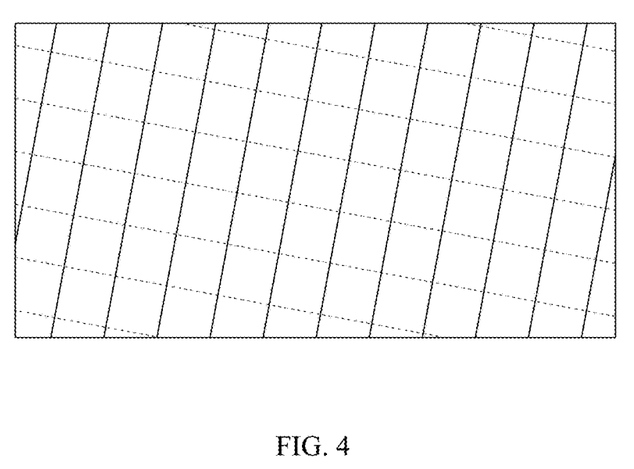
FIG. 4 is a schematic plan view of an arrangement of the cylinder lens in a selective embodiment of the first embodiment of the 3D display module.

With reference to FIG. 4, FIG. 4 is a schematic plan view of an arrangement of the cylinder lens in a selective embodiment of the first embodiment of the 3D display module. In the present embodiment, the extending direction of the first cylinder lens 111 (shown in an area marked by dotted lines in FIG. 4) and the extending direction of the second cylinder lens 121 (shown in an area marked by solid lines in FIG. 4) are perpendicular to each other.

Figure 5:
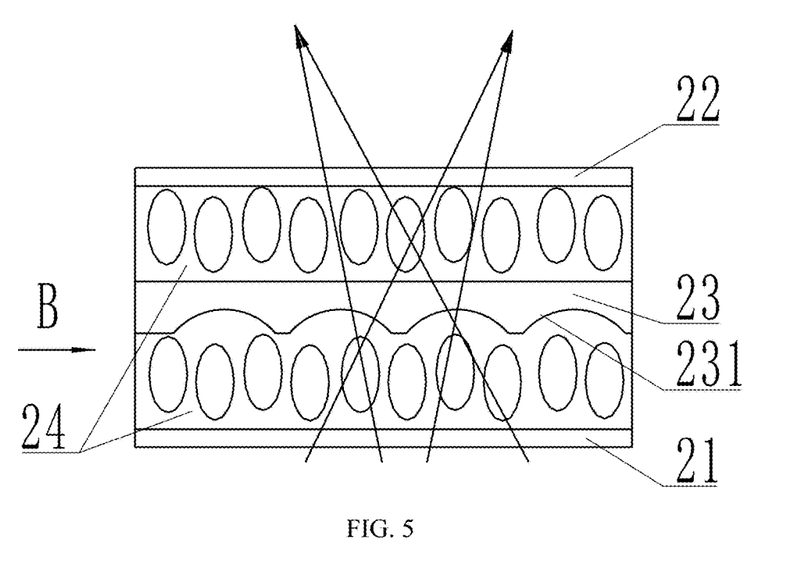
FIG. 5 is a structural schematic diagram of a second embodiment of a 3D display module of the present invention.
Figure 6:
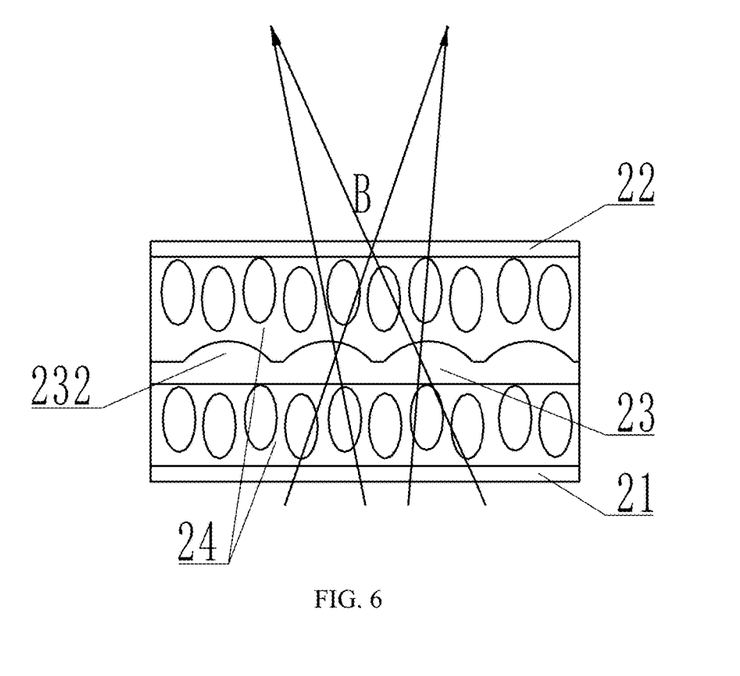
FIG. 6 is a B-direction view of the second embodiment of the 3D display module.
Figure 7:
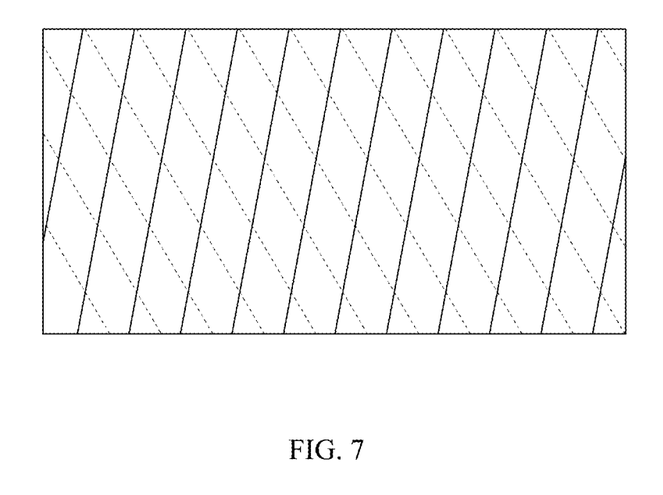
FIG. 7 is a schematic plan view of an arrangement of a cylinder lens in the second embodiment of the 3D display module.

With reference to FIG. 5, FIG. 6 and FIG. 7, FIG. 5 is a structural schematic diagram of a second embodiment of a 3D display module of the present invention, FIG. 6 is a B-direction view of the second embodiment of the 3D display module, and FIG. 7 is a schematic plan view of an arrangement of a cylinder lens in the second embodiment of the 3D display module. In the present embodiment, the 3D display module has:

A first electrode layer 21;

A second electrode layer 22;

A cylinder lens assembly 23 having multiple first cylinder lenses 231 arranged in parallel and multiple second cylinder 232 lens arranged in parallel, wherein the first and second cylinder lenses are respectively formed on two sides of the cylinder lens assembly 23. With reference to FIG. 7, an extending direction of the first cylinder lenses 231 (shown in an area marked by dotted lines in FIG. 7) and an extending direction of the second cylinder lenses 232 (shown in an area marked by solid lines in FIG. 7) are intersect to form a specific angle. A refractive index of the first cylinder lens 231 is different from that of the second cylinder lens 232;

A liquid crystal layer 24 is formed between the first electrode layer 21 and the cylinder lens assembly 23 and the second electrode layer 22 and the cylinder lens assembly 23. The liquid crystals are positive or negative liquid crystals.

Further, the angle between the first and second cylinder lenses 231, 232 is between 0 to 180 degrees, but is not equal to 0 and 180 degrees.

Further, liquid crystal molecules of the liquid crystal layer 24 are controlled to deflect by an electric field between the first and second electrode layers 21, 22. With reference to FIG. 6, FIG. 6 shows a propagation status of lights through the 3D display module (FIG. 6 does not show variations of the liquid crystals). Under a first deflection status, an equivalent refractive index of the liquid crystal layer 24 matches a refractive index of the first cylinder lens 231, but does not match a refractive index of the second cylinder lens 232. At the time, an interface between the first cylinder lens 231 and the liquid crystal molecules does not have a function of refracting lights. At the time, the second cylinder lens 232 provides a beam-splitting function so a direction perpendicular to the second cylinder lens provides an output of a 3D image. With reference to FIG. 5, FIG. 5 shows a propagation status of lights through the 3D display module (FIG. 5 does not show variations of the liquid crystals). Under a second deflection status, the equivalent refractive index of the liquid crystal layer 24 does not match the refractive index of the first cylinder lens 231 but matches the refractive index of the second cylinder lens 232. An interface between the second cylinder lens 231 and the liquid crystal molecules does not have a function of refracting lights. At the time, the first cylinder lens 231 provides a beam-splitting function so a direction perpendicular to the first cylinder lens provides the output of the 3D image.

In the second embodiment of the 3D display module of present invention, by a control technique of combining the cylinder lens arranged in a specific angle and an arrangement of the liquid crystals, the liquid crystal molecules of the liquid crystal layer 24 are controlled to deflect by an electric field between the first and second electrode layers 21, 22 to accomplish a lateral and perpendicular autostereoscopic 3D display effect. With comparison to a complex arrangement of the electrodes of liquid crystals, the present invention has advantages of a simple manufacturing and thinning since a period and a focal length of the cylinder lens are smaller.

Further, the liquid crystal molecule of the liquid crystal layer 24 includes an ordinary refractive index and an extraordinary refractive index. The refractive indexes of the first and second cylinder lenses 231, 232 are between the ordinary and extraordinary refractive indexes. The first and second cylinder lenses 231, 232 are convex lens structures or concave lens structures.

Further, optionally, under the first deflection status, a refractive index difference between the equivalent refractive index of the liquid crystal layer 24 and the refractive index of the first cylinder lens 231 is less than a threshold. A refractive index difference between the equivalent refractive index of the liquid crystal layer 24 and the refractive index of the second cylinder lens 232 is greater than the threshold. Optionally, the equivalent refractive index of the liquid crystal layer 24 is equal to the refractive index of the first cylinder lens 231. Under the second deflection status, the refractive index difference between the equivalent refractive index of the liquid crystal layer 24 and the refractive index of the first cylinder lens 231 is greater than the threshold. The refractive index difference between the equivalent refractive index of the liquid crystal layer 24 and the refractive index of the second cylinder lens 232 is less than the threshold. Optionally, the equivalent refractive index of the liquid crystal layer 24 is equal to the refractive index of the second cylinder lens 232.

Figure 8:
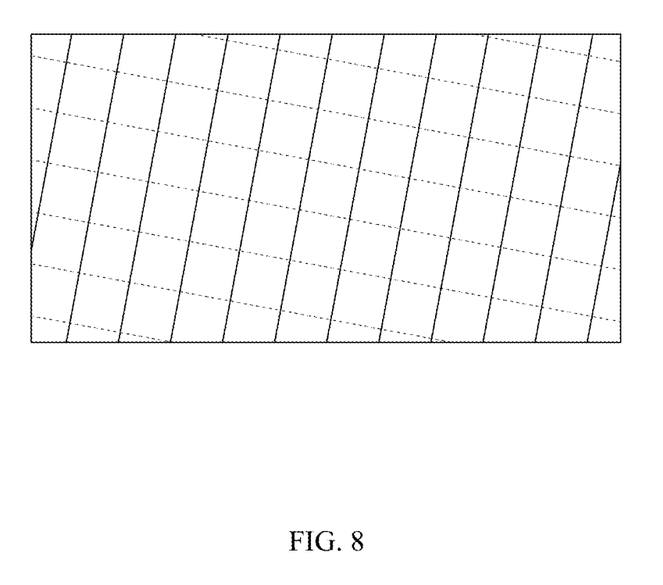
FIG. 8 is a schematic plan view of an arrangement of the cylinder lens in a selective embodiment of the second embodiment of the 3D display module.

With reference to FIG. 8, FIG. 8 is a schematic plan view of an arrangement of the cylinder lens in a selective embodiment of the second embodiment of the 3D display module. In the present embodiment, the extending direction of the first cylinder lens 231 (shown in an area marked by dotted lines in FIG. 8) and the extending direction of the second cylinder lens 232 (shown in an area marked by solid lines in FIG. 8) are perpendicular to each other.

Figure 9:
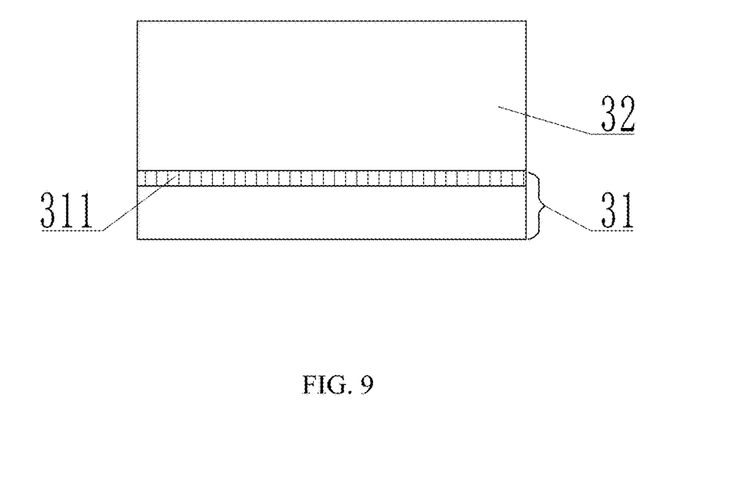
FIG. 9 is a structural schematic diagram of a first embodiment of a 3D display module of the present invention.

With reference to FIG. 9, FIG. 9 is a structural schematic diagram of a first embodiment of a 3D display module of the present invention. In the present embodiment, the 3D display device has a liquid a display panel 31 and the 3D display module 32 of the first or second embodiment mounted on the display panel 31.

Further, the display panel 31 has a polarizer formed next to the 3D display module 32. The polarizer has a previous to light axis. An alignment direction of the liquid crystal layer (not shown in FIG. 9 but referred to the liquid crystal layer in FIG. 1 or FIG. 5) is parallel to the pervious to light axis of the polarizer.

Further, the display panel may be an LCD liquid crystal display panel, an OLED display panel or another display panel. Here is not limited.

An extending direction of the first cylinder lens (not shown in FIG. 9, but referred to the lens assembly in FIG. 2 or FIG. 6) is parallel to one of the long or short sides of the display panel 31. An extending direction of the second cylinder lens is parallel to the other one of the long or short sides of the display panel, or the extending directions of the first and second cylinder lenses are mounted and inclined to the long and short sides of the 3D display device to overcome the Moire and to decrease lopsided pasting.

The first cylinder lens is mounted adjacent to the display panel 31, wherein a focal length of the first cylinder lens under the first deflection status is greater than a focal length of the second cylinder lens under the second deflection status.

In the first embodiment of the 3D display device of the present invention, the liquid crystal molecules of the liquid crystal layer are controlled to deflect by the electric field between the first and second electrode layers. Under the first deflection status, the equivalent refractive index of the liquid crystal layer matches the refractive index of the first cylinder lens, but does not match the refractive index of the second cylinder lens. At the time, the interface between the first cylinder lens and the liquid crystal molecules does not have the function of refracting lights. At the time, the second cylinder lens provides the beam-splitting function so the direction perpendicular to the second cylinder lens provides an output of the 3D image. Under the second deflection status, the equivalent refractive index of the liquid crystal layer does not match the refractive index of the first cylinder lens but matches the refractive index of the second cylinder lens. The interface between the second cylinder lens and the liquid crystal molecules does not have a function of refracting lights. At the time, the first cylinder lens provides the beam-splitting function so the direction perpendicular to the first cylinder lens provides the output of the 3D image. By the control technique of combining the cylinder lens arranged in the specific angle and an arrangement of the liquid crystals, a lateral and perpendicular autostereoscopic 3D display effect is accomplished. With comparison to a complex arrangement of the electrodes of liquid crystals, the present invention has the advantages of a simple manufacturing and thinning since a period and a focal length of the cylinder lens are smaller.

Figure 10:
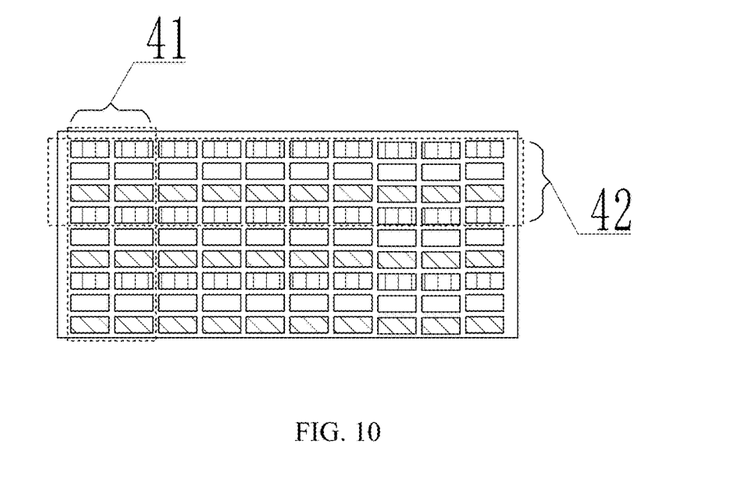
FIG. 10 is a schematic view of an arrangement of a single cylinder lens corresponding to a pixel in a selective embodiment of the first embodiment of 3D display device.

Further, with reference to FIG. 10, FIG. 10 is schematic view of an arrangement of a single cylinder lens corresponding to a pixel in a selective embodiment of the first embodiment of 3D display device. The first cylinder lends 41 is parallel to the short side of the display and the second cylinder lens is 42 parallel to the long side of the display. The first cylinder lens 41 and second cylinder lens 42 has multiple pixels.

The 3D display devices in the above-mentioned embodiments can apply in a portable electronic equipment, such as the smart phone, the tablet computer, the notebook computer and the smart phone. Here is not limited.

The above embodiments of the present disclosure are not used to limit the claims of this disclosure. Any use of the content in the specification or in the drawings of the present disclosure which produces equivalent structures or equivalent processes, or directly or indirectly used in other related technical fields is still covered by the claims in the present disclosure.

What is claimed is:

1. A three-dimensional (3D) display module, wherein the characteristic is in that the 3D display module comprises:
    a first cylinder lens assembly having multiple first cylinder lenses arranged in parallel;
    a second cylinder lens assembly having multiple second cylinder lenses arranged in parallel, wherein an extending direction of the first cylinder lens and an extending direction of the second cylinder lens intersect to form a specific angle, and a refractive index of the first cylinder lens is different from a refractive index of the second cylinder lens;
    a liquid crystal layer formed between the first and second cylinder lens assemblies or respectively formed on two sides of the first and second cylinder lens assemblies;
    a first electrode layer formed on a side of the liquid crystal layer; and
    a second electrode layer formed on another side of the liquid crystal layer;
    wherein, multiple liquid crystal molecules of the liquid crystal layer are controlled to deflect by an electric field between the first and second electrode layers, wherein under a first deflection status, an equivalent refractive index of the liquid crystal layer matches a refractive index of the first cylinder lens, but does not match a refractive index of the second cylinder lens; and under a second deflection status, the equivalent refractive index of the liquid crystal layer does not match the refractive index of the first cylinder lens but matches a refractive index of the second cylinder lens.

2. The 3D display module according to claim 1, wherein the characteristic is in that the liquid crystal molecules of the liquid crystal layer comprises an ordinary refractive index and an extraordinary refractive index, wherein the refractive indexes of the first and second cylinder lenses are between the ordinary and extraordinary refractive indexes.

3. The 3D display module according to claim 1, wherein the characteristic is in that under the first deflection status, a refractive index difference between the equivalent refractive index of the liquid crystal layer and the refractive index of the first cylinder lens is less than a threshold, a refractive index difference between the equivalent refractive index of the liquid crystal layer and the refractive index of the second cylinder lens is greater than the threshold; and under the second deflection status, the refractive index difference between the equivalent refractive index of the liquid crystal layer and the refractive index of the first cylinder lens is greater than the threshold and the refractive index difference between the equivalent refractive index of the liquid crystal layer and the refractive index of the second cylinder lens is less than the threshold.

4. The 3D display module according to claim 1, wherein the characteristic is in that the liquid crystal layer is formed between the first and second lens assemblies, wherein the first electrode layer is formed on a side of the first cylinder lens assembly departing from the liquid crystal layer and the second electrode layer is formed on a side of the second cylinder lens assembly departing from the liquid crystal layer.

5. The 3D display module according to claim 1, wherein the characteristic is in that an extending direction of the first cylinder lens and an extending direction of the second cylinder lens are perpendicular to each other.

6. The 3D display module according to claim 1, wherein the characteristic is in that the first and second cylinder lenses are respectively convex lens structures or concave lens structures.

7. A 3D display device, wherein the characteristic is in that the 3D display device comprises a display panel and the 3D display module according to claim 1 mounted on the display panel.

8. The 3D display device according to claim 7, wherein the characteristic is in that the display panel comprises a polarizer formed next to the 3D display module and having previous to light axis, wherein an alignment direction of the liquid crystal layer is parallel to the pervious to light axis of the polarizer.

9. The 3D display device according to claim 7, wherein the characteristic is in that the an extending direction of the first cylinder lens is parallel to one of the long or short sides of the display panel 31; and an extending direction of the second cylinder lens is parallel to the other one of the long or short sides of the display panel, or the extending directions of the first and second cylinder lenses are mounted and inclined to the long and short sides of the 3D display device.

10. The 3D display device according to claim 1, wherein the characteristic is in that the first cylinder lens is mounted adjacent to the display panel, wherein a focal length of the first cylinder lens under a first deflection status is greater than a focal length of the second cylinder lens under a second deflection status.

* * * * *